US007370082B2

(12) United States Patent
Pinkerton

(10) Patent No.: US 7,370,082 B2
(45) Date of Patent: May 6, 2008

(54) REMOTE INVALIDATION OF PRE-SHARED RDMA KEY

(75) Inventor: James T. Pinkerton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 10/434,793

(22) Filed: May 9, 2003

(65) Prior Publication Data

US 2004/0225720 A1 Nov. 11, 2004

(51) Int. Cl.
*G06F 15/167* (2006.01)
*G06F 12/00* (2006.01)

(52) U.S. Cl. .................................. 709/212; 711/147
(58) Field of Classification Search ................. 709/212, 709/228; 711/147
See application file for complete search history.

(56) References Cited

U.S. PATENT DOCUMENTS

| | | | |
|---|---|---|---|
| 4,032,899 A | 6/1977 | Jenny et al. | 364/200 |
| 4,577,272 A | 3/1986 | Ballew et al. | 364/200 |
| 5,127,104 A | 6/1992 | Dennis | 395/650 |
| 5,410,696 A | 4/1995 | Seki et al. | 395/650 |
| 5,504,903 A | 4/1996 | Chen et al. | 395/700 |
| 5,621,894 A | 4/1997 | Menezes et al. | 395/200.12 |
| 5,634,070 A | 5/1997 | Robinson | 395/800 |
| 5,678,021 A | 10/1997 | Pawate et al. | 395/431 |
| 5,717,691 A | 2/1998 | Dighe et al. | 370/401 |
| 5,737,520 A | 4/1998 | Gronlund et al. | 395/183.15 |
| 5,889,848 A | 3/1999 | Cookson | 379/230 |
| 5,913,028 A | 6/1999 | Wang et al. | 395/200.33 |
| 6,021,274 A | 2/2000 | Reed et al. | 395/706 |
| 6,065,085 A | 5/2000 | Odenwald, Jr. et al. | 710/129 |
| 6,141,705 A | 10/2000 | Anand et al. | 710/15 |
| 6,223,240 B1 | 4/2001 | Odenwald et al. | 710/129 |
| 6,321,276 B1 | 11/2001 | Forin | 710/3 |

(Continued)

FOREIGN PATENT DOCUMENTS

EP 0778523 A2 12/1996

(Continued)

OTHER PUBLICATIONS

Pinkerton, James T.; "The Case for RDMA"; RDMA Consortium; May 29, 2002.

(Continued)

*Primary Examiner*—Ario Etienne
*Assistant Examiner*—El Hadji Sall
(74) *Attorney, Agent, or Firm*—Workman Nydegger

(57) ABSTRACT

Methods, systems, and computer program products for reducing communication overhead to make remote direct memory access more efficient for smaller data transfers. An upper layer protocol or other software creates a receive buffer and a corresponding lookup key for remotely accessing the receive buffer. In response to receiving a data message, the remote direct memory access protocol places a data portion of the data message into the receive buffer and prevents further changes. The upper layer protocol or software confirms that further changes to the receive buffer have been prevented. A lower layer transport protocol may be used to deliver data received from a remote system to the remote direct memory access protocol. Data transfers may occur through buffer copies with relatively lower overhead but also relatively lower throughput, or may occur through remote direct memory access to offer relatively higher throughput, but also imposing relatively higher overhead.

31 Claims, 6 Drawing Sheets

U.S. PATENT DOCUMENTS

| | | | |
|---|---|---|---|
| 6,345,311 B1 | 2/2002 | Breslau et al. | 709/310 |
| 6,345,347 B1 | 2/2002 | Biran | 711/163 |
| 6,370,559 B1 | 4/2002 | Hoffman | 708/625 |
| 6,530,061 B1 | 3/2003 | Labatte | 714/807 |
| 6,675,200 B1 * | 1/2004 | Cheriton et al. | 709/212 |
| 6,697,868 B2 | 2/2004 | Craft et al. | 709/230 |
| 6,760,799 B1 | 7/2004 | Dunlap et al. | 710/260 |
| 6,904,519 B2 | 6/2005 | Anand et al. | 713/100 |
| 6,993,644 B2 | 1/2006 | Anand et al. | 713/1 |
| 7,007,103 B2 | 2/2006 | Pinkerton et al. | 709/238 |
| 7,010,607 B1 * | 3/2006 | Bunton | 709/228 |
| 7,089,289 B1 * | 8/2006 | Blackmore et al. | 709/212 |
| 2003/0084185 A1 | 5/2003 | Pinkerton | 709/236 |
| 2003/0204631 A1 | 10/2003 | Pinkerton et al. | 709/249 |
| 2004/0193811 A1 * | 9/2004 | Chadalapaka et al. | 711/147 |
| 2006/0095754 A1 | 5/2006 | Hyder et al. | 713/1 |

FOREIGN PATENT DOCUMENTS

| | | |
|---|---|---|
| EP | 1086421 | 3/2001 |
| JP | 2002517855 | 6/2002 |
| WO | WO 99/64952 | 5/1998 |

OTHER PUBLICATIONS

Pinkerton, James T., Frank Berry, Dwight Barron, Ellen Deleganes, Hemal Shah, tom Talpey; "RDMAC Verbs Overhead Anaylysis,Verbs Overhead Analysis for ULPs"; Sep. 11, 2002, updated Oct. 1, 2002; pp. 1-61.

Gott, Robert A., "Intelligent I/O Eases Subsystem Development," Computer Design, vol. 37, No. 5, pp. 106, 108-110, May 1, 1998.

Yangsuk Lee and Soonhoi Ha: "An Efficient Implementation of the BSP Programming Library for VIA"; *Parallel Processing Letters*; Mar. 2002; vol. 12, No. 1; pp. 65-77.

Hellwagner, Hermann and Ohlenroth,Matthias; "VI Architecture Communication Features and Performance on the Giganet Cluster LAN"; *Future Generation Computer Systems*; Jan. 2002; vol. 18, No. 3; pp. 421-433.

Hellwagner, Hermann and Ohlenroth, Matthias; "Exploring the Perforamnce of VI Architecture Communication Features in the Giganet Cluster LAN"; *Proceedings of the International Conference on Parallel and Distributed Processing Techniques and Applicaitons*; PDPTA '2000; vol. 5; pp. 2923-2929.

Yangsuk Kee and Soonhoi Ha; "xBSP: An Efficient BSP Implementation for cLAN"; *Proceedings First IEEE/ACM International Symposium on Cluster Computing and the Grid*; pp. 237-244.

Shurbanov, Vladimir and Avresky, Dimiter; "Flow Control in ServerNet Clusters"; *Journal of Supercomputing*; Jun. 2002; vol. 22, No. 2; pp. 161-173.

Speight, Evan; Abdel,Shafi, Hazim; and Bennett, John K.; "Realizing the Performance Potential of the Virtual Interface Architecture"; *Conference Proceedings of the 1999 International Conference on Supercomputing*; 1999; pp. 184-192.

Wong, William; "Dual-Port Host Adapter Streamlines Infiniband Designs";*Electric Design*; vol. 50, No. 10; pp. 43-47.

Voruganti, Kaladhar and Sarkar, Prasenjit; "An Analysis of Three Gigabit Networking Protocols for Storage Area Networks"; *Conference Proceedings of the 2001 IEEE International Performance, Computing, and Communications Conference*; 2001; Cat. No. 01CH37210; pp. 259-265.

\* cited by examiner

REMOTE INVALIDATION OF PRE-SHARED RDMA KEY

CROSS-REFERENCE TO RELATED APPLICATIONS

N/A

BACKGROUND OF THE INVENTION

1. The Field of the Invention

The present invention relates to remote direct memory access. More particularly the present invention relates to methods, systems, and computer program products for reducing communication overhead between protocol layers to make remote direct memory access more efficient.

2. Background and Related Art

In computer systems, data frequently must be copied from one buffer to another. Without direct memory access (DMA), copy operations are performed by a computer system's central processing unit (CPU). While performing a copy operation, the CPU is unavailable for more important and more sophisticated operations. Accordingly, depending on the amount of data to copy, use of a CPU in buffer copy operations may lead to poor resource management and result in slow system performance.

In traditional DMA, the CPU programs a DMA engine to perform the buffer copy, such as by specifying a source address, a destination address, and a length to copy. The DMA engine then moves the data from one buffer to another, without further impact on CPU resources. When the buffer copy is complete, the DMA engine notifies the CPU.

FIG. 1 illustrates a remote DMA between host 100A and host 100B. In order to copy the contents of buffer 120A at host 100A to buffer 120B at host 100B, hosts 100A and 100B program remote network interface cards (RNICs) 110A and 110B to make the transfer, such as by identifying a source address at a particular host, a destination address at a particular host, and a length to copy. This frees, or reduces the utilization of, CPUs 130A and 130B at hosts 100A and 100B, making CPUs 130A and 130B more available for other activities. RNIC 110B receives the data and transfers it to buffer 120B, without using CPU 130B. Thus, RNICs 110A and 110B operate as remote DMA (RDMA) engines, with corresponding RMDA interfaces 112A and 112B. RDMA transfers use zero copy paths 124A and 124B, allowing for data transfer (throughput) at the rate of the network or fabric. As in traditional DMA, the RNICs notify the appropriate CPU when finished making the transfer.

Note that in FIG. 1 two additional paths from the RNICs 110A and 110B to buffers 120A and 120B are illustrated. Buffer copy paths 122A and 122B are directed to buffers 120A and 120B through intermediate private buffer pools 140A and 140B, respectively, whereas zero copy paths 124A and 124B directly connect to buffers 120A and 120B. Buffer copy paths 122A and 122B use CPUs 130A and 130B for copy operations. In other words, buffer copy paths 122A and 122B result in higher CPU utilization, meaning the CPU is less available to perform other operations. It also should be noted here that network throughput (data transfer at network speed) is increasingly likely to exceed the transfer rate available from an RNIC's CPU. Even so, one reason for the two separate paths relates to the communication overhead associated with zero copy paths 124A and 124B. Remote direct memory access using zero copy paths 124A and 124B introduces some amount of overhead to RDMA (e.g., the overhead to program RNICs 110A and 110B for an RDMA transfer). As described in more detail with respect to FIGS. 3A and 3B below, for small data transfers, this overhead may negate the faster data throughput that zero copy RDMA offers. In other words, for small data transfers, it may be faster to use the buffer copy path, and sacrifice CPU utilization at the RNIC, rather than use the zero copy path that RDMA offers.

Conventionally, the zero copy path overhead for RDMA has been relatively significant, requiring transfers on the order of 32 k bytes and above to justify its use. As can be appreciated, many networks frequently have data transfers of less than 32 k bytes, making zero copy RDMA less attractive for certain operations. Accordingly, methods, systems and computer program products are desired to reduce the communication overhead for zero copy paths so the performance benefits of faster data throughput can be used for relatively smaller data transfers.

BRIEF SUMMARY OF THE INVENTION

The present inventions relates to reducing communication overhead to make remote direct memory access more efficient for smaller data transfers. In accordance with example embodiments of the present invention, an upper layer protocol or other software creates a receive buffer and a corresponding lookup key for remotely accessing the receive buffer. When a data message is received, the remote direct memory access protocol places a data portion of the data message into the receive buffer and prevents further changes to the receive buffer. Having the remote direct memory access protocol, rather than the upper layer protocol, prevent further changes to the receive buffer reduces overhead that is otherwise associated with remote direct memory access. The upper layer protocol or software confirms that further changes to the receive buffer have been prevented.

The data message may comprise a header portion that includes an instruction to invalidate the lookup key as an argument. A lower layer transport protocol may be used to deliver data received from a remote system to the remote direct memory access protocol. In some embodiments, data transfers may occur through one or more intermediate buffers with relatively lower overhead but also relatively lower throughput, or may bypass the intermediate buffers and use remote direct memory access to offer relatively higher throughput, but also imposing relatively higher overhead. Reducing the relatively higher overhead for remote direct memory access makes bypassing the intermediate buffers more attractive for relatively smaller data transfers, that otherwise would be more efficiently made using a more traditional buffer copy.

Receiving remote data may be part of an overall read operation, a disk operation, file transfers operation, database operation, etc. If the upper layer protocol determines that the remote direct memory access protocol failed to prevent further changes to the receive buffer, the upper layer protocol may prevent further changes. As a security measure, the remote direct memory access protocol may determine if an instruction to invalidate a lookup key, and thereby prevent further changes to the receive buffer, originated within an authorized protection domain.

In accordance with other example embodiments, an upper layer protocol registers a receive buffer for remote direct memory access with a corresponding lookup key to use in accessing the receive buffer. When a remote direct memory access protocol receives a data message from a remote system that includes both data to write to the receive buffer and an instruction to invalidate the lookup key, the remote direct memory access protocol writes the data directly into the receive buffer and invalidates the lookup key so that no further change can be made to the receive buffer. As a security precaution, the remote direct memory access protocol may determine if the instruction to invalidate the lookup key originated within an authorized protection domain. The upper layer protocol verifies that the lookup key for the receive buffer has been invalidated, and if not invalidates the lookup key.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for reducing communication overhead to make remote direct memory access more efficient for smaller data transfers. The embodiments of the present invention may comprise one or more special purpose and/or one or more general purpose computers including various computer hardware, as discussed in greater detail below.

Figure 2:
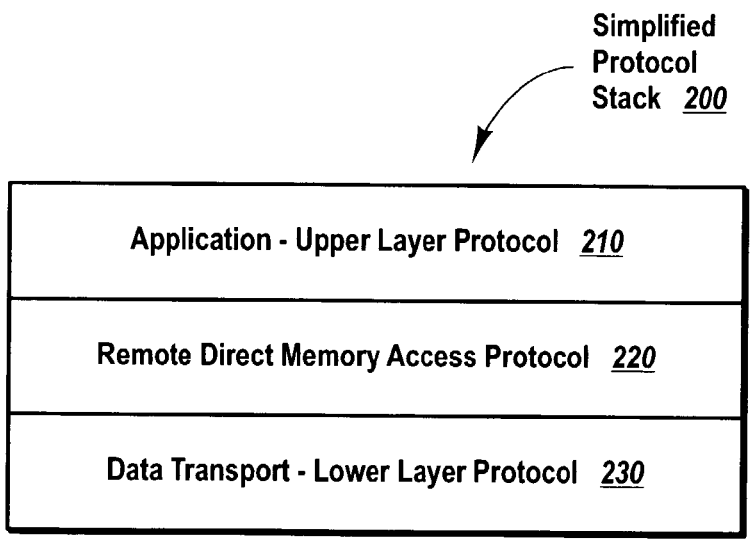
FIG. 2 shows an example protocol stack for remote direct memory access.

FIG. 2 shows an example protocol stack 200 for remote direct memory access. The protocol stack has been simplified somewhat to show an application or upper layer protocol (ULP) 210, a remote direct memory access protocol (RDMA) 220, and a data transport or lower layer protocol (LLP) 230. The application or upper layer protocol 210 represents a consumer of data and is responsible for further processing the RDMA data once it is received. The ULP may be an operating system, application, adaptation layer, proprietary device, etc. A file system is one example of application or upper layer protocol 210. As used in this application, ULP should be interpreted broadly to encompass any consumer of RDMA data, which may be implemented as one or more layers.

RDMA 220 provides direct memory access operations for ULP 210 and may be implemented as one or more layers. Essentially, RDMA 220 is responsible for placing data directly into its final destination, without processing by the ULP 210. In an example implementation, RDMA 220 includes a data placement layer build on top of an RDMA layer. The data placement layer offers a subset of the full functionality available from the RDMA layer. In this example implementation, memory buffer placement information is included with the payload units of the LLP 230. LLP 230 is responsible for delivering data to RDMA 220 for processing. Examples of an LLP include Stream Control Transmission Protocol (SCTP), Marker PDU Aligned Framing (MPA), Transmission Control Protocol (TCP), and other transport protocols. In a general sense, LLP 230 is simply the layer below RDMA 220, and like ULP 210, may be implemented as one or more layers.

Figure 1:
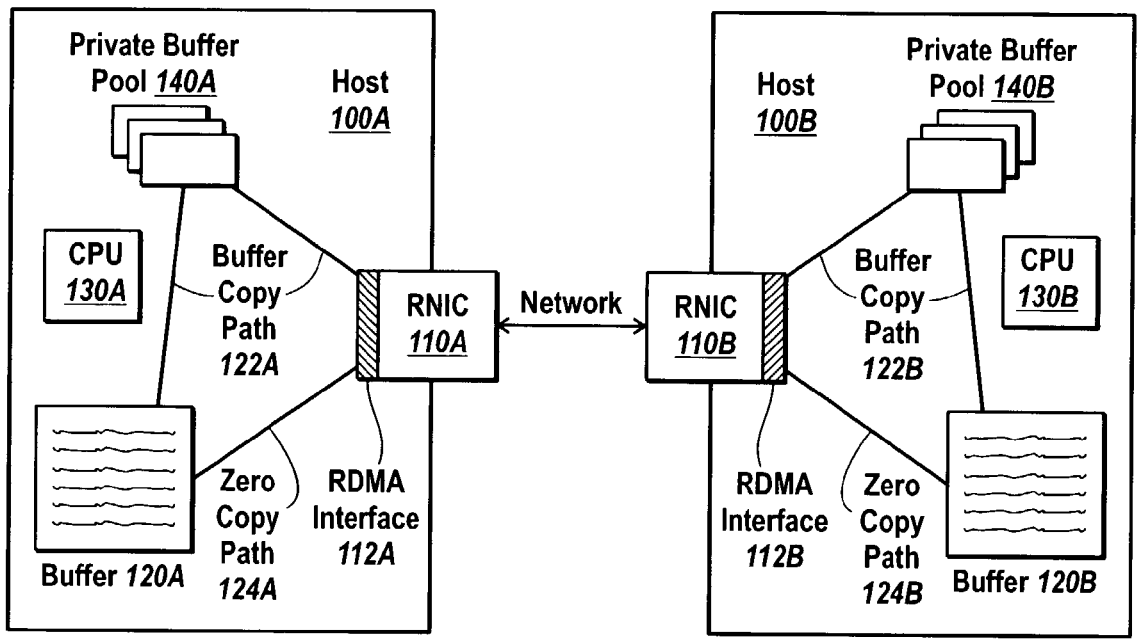
FIG. 1 illustrates remote direct memory access between two hosts.
Figure 3A:
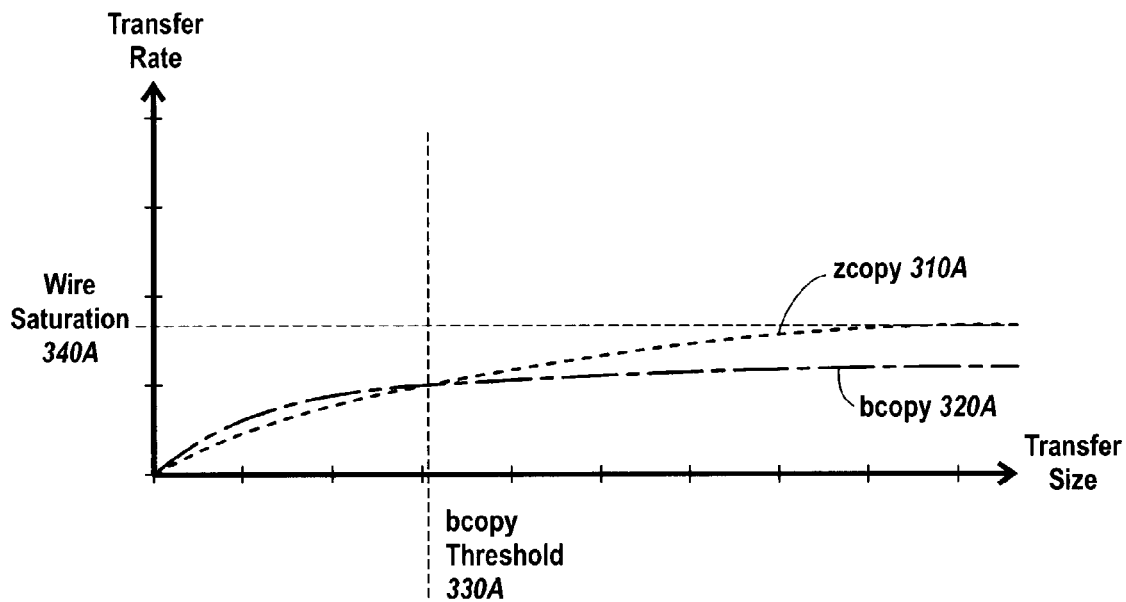
FIGS. 3A-3B illustrate an example reduction in overhead for a zero buffer copy implementation and the corresponding reduction in the buffer copy threshold.
Figure 3B:
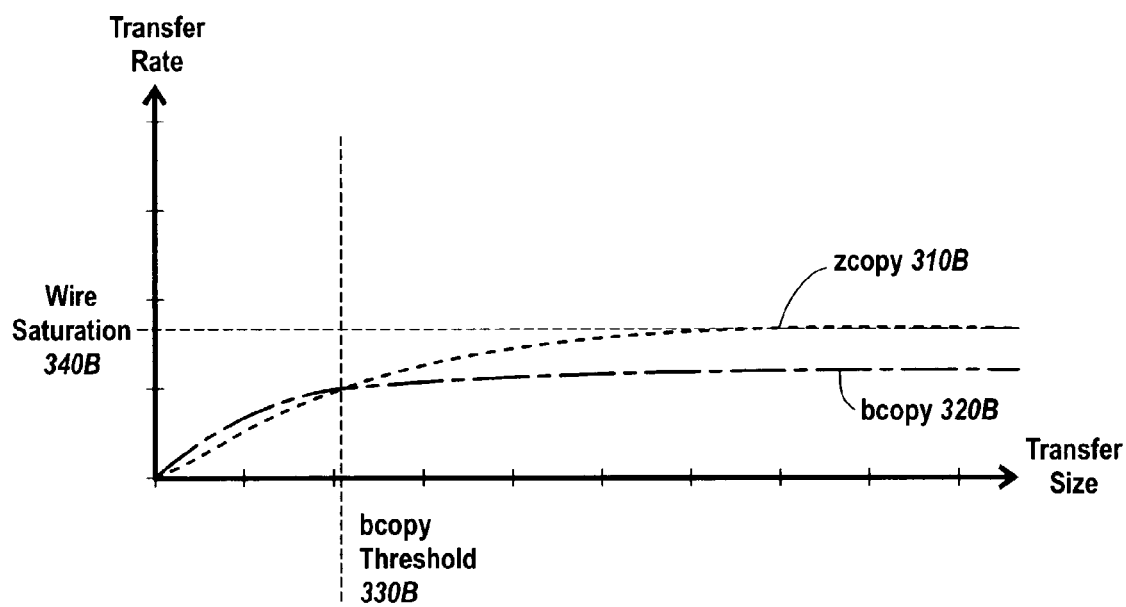

FIGS. 3A-3B illustrate an example reduction in overhead for a zero buffer copy RDMA implementation and a corresponding reduction in the buffer copy threshold. As described above with respect to FIG. 1, data may be written to buffers 120A and 120B through either buffer copy paths 122A and 122B or zero copy paths 124A and 124B using RDMA. The difference between the two paths relates to communication overhead and potential throughput. Zero copy paths 124A and 124B offer relatively higher potential throughput (e.g., the network transfer rate), but impose relatively higher overhead (programming the RNICs for RDMA), whereas buffer copy paths 122A and 122B offer relatively lower potential throughput (the CPU transfer rate) with relatively lower overhead. As a result, buffer copy paths 122A and 122B may be faster than zero copy paths 124A and 124B for relatively smaller data transfers, even though zero copy paths 124A and 124B have higher potential throughput. Of course, even if slower, the zero copy paths 124A and 124B may be attractive for relatively smaller data transfers because they allow the RNIC's CPU to perform other tasks during an RDMA transfer.

In FIGS. 3A and 3B, bcopy 320A and bcopy 320B graph transfer rate versus transfer size for buffer copies where the network is relatively fast (i.e., the network transfer rate or bandwidth is fast enough that the RNIC CPU cannot saturate the network). Note that in both Figures, bcopy 320A and bcopy 320B performance curves are identical. Zcopy 310A and zcopy 310B graph transfer rate versus transfer size for RDMA zero copies. For larger transfer sizes, zcopy 310A and zcopy 310B approach the wire saturation rates 340A and 340B. Note, however, that zcopy 310B differs from zcopy 310A in that the overhead or CPU utilization associated with zcopy 310B has been reduced.

The bcopy thresholds 330A and 330B represent the transfer size where it becomes more efficient to use an RDMA zero copy path than a buffer copy path. For smaller transfer sizes, the overhead of a zero buffer path dominates, making it more efficient to use a buffer copy path, even though as shown in FIGS. 3A and 3B, the buffer copy paths have slower peak throughput than the zero copy paths. By reducing the overhead for a zcopy 310B, bcopy threshold 330B is lowered so that zcopy 310 becomes more efficient for relatively smaller data transfers.

It should be emphasized here the FIGS. 3A and 3B are not intended to show specific transfer sizes or transfer rates. Rather, FIGS. 3A and 3B show the relationship between buffer copy paths and zero copy paths based on different zero copy path overhead. Nevertheless, traditionally bcopy threshold has been well above the 4-8k byte range. As a result, using zcopy has been less efficient than bcopy for many typical data transfers. Again, however, it should be emphasized that the actual transfer size is not necessarily relevant to the present application, but rather, the reduction in zcopy overhead and corresponding reduction in the bcopy threshold so that zcopy becomes more efficient for relatively smaller transfer sizes than it was prior to practicing the present invention.

Figure 4A:
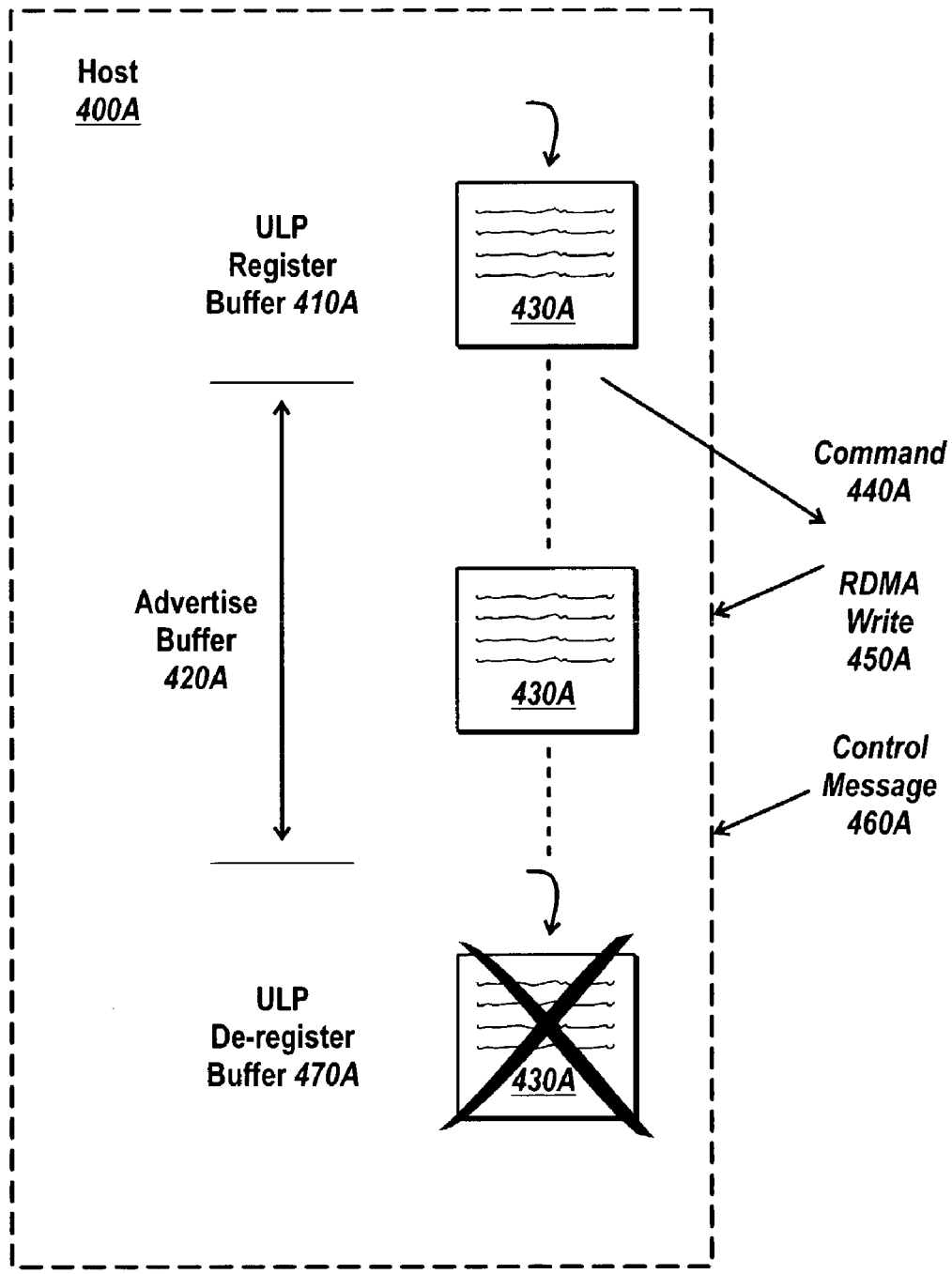
FIGS. 4A-4B compare an example prior art disk read with a disk read using remote direct memory access in accordance with the present invention.
Figure 4B:
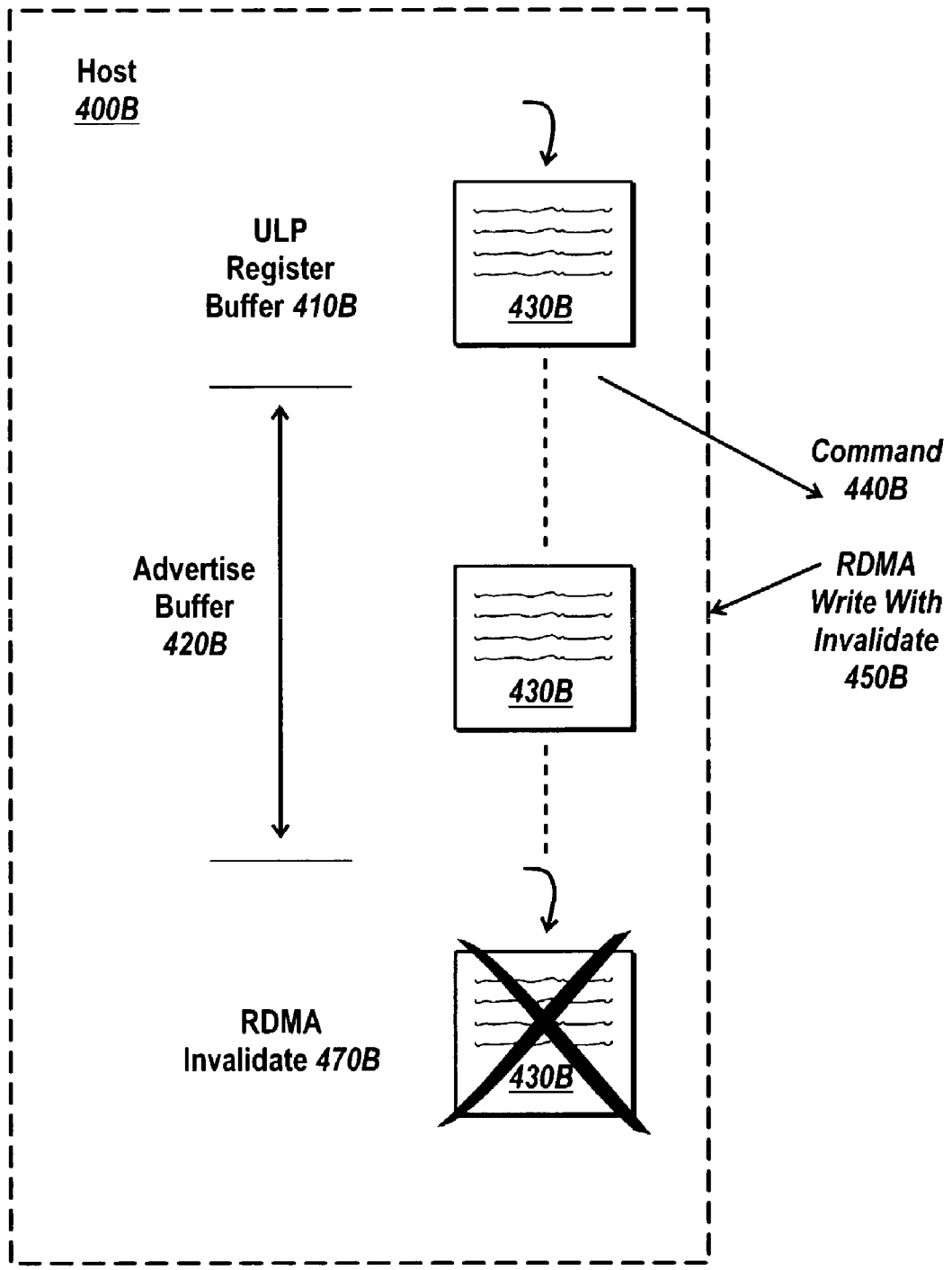

An example of reducing the bcopy threshold is shown in FIGS. 4A-4B by comparing an example prior art RDMA disk read with an RDMA disk read in accordance with the present invention. It should be emphasized, however, that the present invention may be practiced in a wide variety of network operations, including a file transfer operation, a database operation, a disk operation, etc., and is not necessarily limited to the example RDMA disk read illustrated in FIG. 4B. In host 400A, an ULP registers 410A buffer 430A. Once registered, the buffer is advertised 420A, meaning that it can be written to by a remote system during this time. Host 400A issues a command 440A, such as a disk read. The command is followed by an RDMA write 450B to buffer 430A and a control message 460A to indicate that the write has completed. The control message 460A may be included with RDMA write 450A or may be a separate message. Following the control message 460A, the ULP at host 400A deregisters 470A the buffer to prevent further changes to the buffer while the ULP processes the data. Some application may choose not to deregister 470A the buffer. This however, leaves host 400A open to security attacks by a remote host writing to the buffer after a local application assumes it owns the buffer exclusively.

For a remote Small Computer System Interface (SCSI) disk, FIG. 4A may be represented in the pseudo code shown below in Table I. The pseudo code references both tagged buffers and untagged buffers. A tagged buffer is a buffer that is explicitly advertised to a remote system through the exchange of an STag (steering tag) to identify the tagged buffer, a target offset to identify the offset within the tagged buffer, and a length. An untagged buffer is a buffer that is not explicitly advertised to a remote system.

The RNIC supports the following interfaces:

Receive Queue—RQ(Buffer)—posts an untagged buffer named "Buffer" to the receive queue. The name of the buffer is artificial because buffers are consumed in FIFO order, so the name simply helps keep track of which buffer was consumed. When a buffer is consumed from the RQ it generates a Completion(RQ: name-of-buffer).

Completion—Completion( . . . )—returns a completion from the completion queue. In Table I, the format is Completion(RQ:description_of_message received).

RNIC Interface—Returned Stag=RI(Memory_Register (Buffer, Local/Remote))—posts a request to the RNIC which registers a physical address/length list with the NIC and returns an STag. This may take a fair amount of time if the implementation transfers the address/length list to the RNIC before returning from this call. The call can be used to register a buffer for local access or remote access. If it is registered for remote access, the deregister must occur before the buffer is handed to the ULP or the previously mentioned security attack is possible.

SendTagged(LocSTag)—generates a send message. It takes a local buffer that is described by an STag and offset (a buffer virtual address also may be included in the call). The STag has been setup previously during memory registration for the local buffer. Some implementations may allow the buffer to be represented directly as a physical address/length, rather than as an STag.

SendTagged&Inv(LocSTag, RemSTag)—same as SendTagged, but takes as input an STag which should be invalidated at the remote system (RemSTag).

SendRDMAWrTagged(LocSTag, RemSTag)—transfer the buffer referred to by LocSTag from the local peer to the remote system buffer referred to by RemSTag using an RDMA write. Some implementations may allow the buffer to be represented directly as a physical address/length, rather than as an STag.

The following calls are unrelated to RDMA, but are shown for completeness:

PerformWork( )—perform work on the requested command. For iSCSI, the command is to retrieve the requested data.

create_SCSI_cmd(STagBuf, command)—creates the SCSI command in a buffer that was previously registered with the RI (not shown in pseudo code), meaning that an STag already exists for the buffer. An implementation may have a single, large buffer, represented with one STag. When a command is to be generated, it simply carves out a section of the buffer, and sends just that portion with an offset and length.

TABLE I

| At Initiator | At Target |
| --- | --- |
| RQ(BufferC) | RQ(BufferD) |
| InitSTag = RI(Memory_Register(ULPBuffer, Remote)) | Completion(RQ: Recv of SCSI cmd into BufferD) |
| | PerformWork( ) |
| | TargetSTag = RI(Memory_Register(TargetBuffer, Local)) |
| create_SCSI_cmd(STagBuf, SCSIRdCmd&InitSTag) | SendRDMAWrTagged(TargetSTag, InitSTag) |
| SendTagged(STagBuf) | create_SCSIcmd(STagBufferS, SCSIResponse) |
| Completion(RQ:SCSI Response into BufferC) | SendTagged(STagBufferS) |
| RI(Memory_Deregister(ULPBuffer) | |

Typically, the register and deregister operations represent significant overhead for a zero copy path because they typically require a round trip (to the RNIC hardware and back) to set up address translation tables or to disable them. As described above, in many circumstances the overhead is significant enough to make a buffer copy path more efficient for smaller transfer sizes. Although buffer copy paths may offer better performance in some circumstances, zero copy paths and the potential of approaching wire saturation for data transfers represent a significant advancement, particularly for network speeds that surpass the speed with which the CPU can copy data.

Similar to FIG. 4A, in host 400B of FIG. 4B, a ULP registers 410B buffer 430B. Once registered, the buffer is advertised 420B, meaning that it can be written to by the remote system during this time. Host 400B issues a command 440B, such as a disk read. The command is followed by an RDMA write with invalidate 450B with data to be written to buffer 430B. Note here, however, that an RDMA invalidate 470B prevents further changes to the buffer while the ULP processes the data in buffer 430B. This invalidate occurs within the RDMA protocol and is initiated by the sender of the RDMA write with invalidate 450B. Accordingly, the ULP does not need to deregister buffer 430B, reducing the zero copy path overhead, which reduces the bcopy threshold and makes the zero copy path more attractive or relatively smaller data transfers. The RDMA write with invalidate command 450B may be followed by a control message (such as control message 460A in FIG. 4A) to indicate that the write is complete, or the control message may be included within RDMA write 450B.

For a remote Small Computer System Interface (SCSI) disk, FIG. 4B may be represented in the pseudo code shown below in Table II. New commands (i.e., those not appearing in Table I) or commands that have changed are bolded, and deleted commands (i.e., those shown in Table I, but no longer needed) as shown in strikethough. Note in particular, therefore, the new "SendTagged&Inv" command which as described above allows the target to invalidate a remote buffer, the deleted "Memory_Deregister" command, and the addition of a check to verify that the correct buffer was deregistered. As a security measure, the RNIC should check to see that a received message to invalidate a buffer originated within an authorized protection domain and that it is for a valid buffer. If either is not true, it should not invalidate the STag and should notify the ULP that no invalidation occurred. If the RNIC did not do this, it would be possible for a rogue process to invalidate random buffers. If the correct buffer was not deregistered, then the ULP should deregister the buffer to maintain the same level of security protection.

TABLE II

| At Initiator | At Target |
|---|---|
| RQ(BufferC) | RQ(BufferD) |
| InitSTag = RI(MemoryRegister(ULPBuffer, Remote)) | Completion(RQ: Recv of SCSI cmd into BufferD) |
| create_SCSI_cmd(STagBuf, SCSIRdCmd&InitSTag) | PerformWork( ) |
| SendTagged(STagBuf) | TargetSTag = RI(Memory_Register(TargetBuffer, Local)) |
| Completion(RQ:SCSI Response into BufferC) | SendRDMAWrTagged(TargetSTag, InitSTag) |
| Check correct buffer deregistered( ) | create_SCSI_cmd(STagBufferS, SCSIResponse) |
| | SendTagged&Inv(STagBufferS, InitSTag) |

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 5:
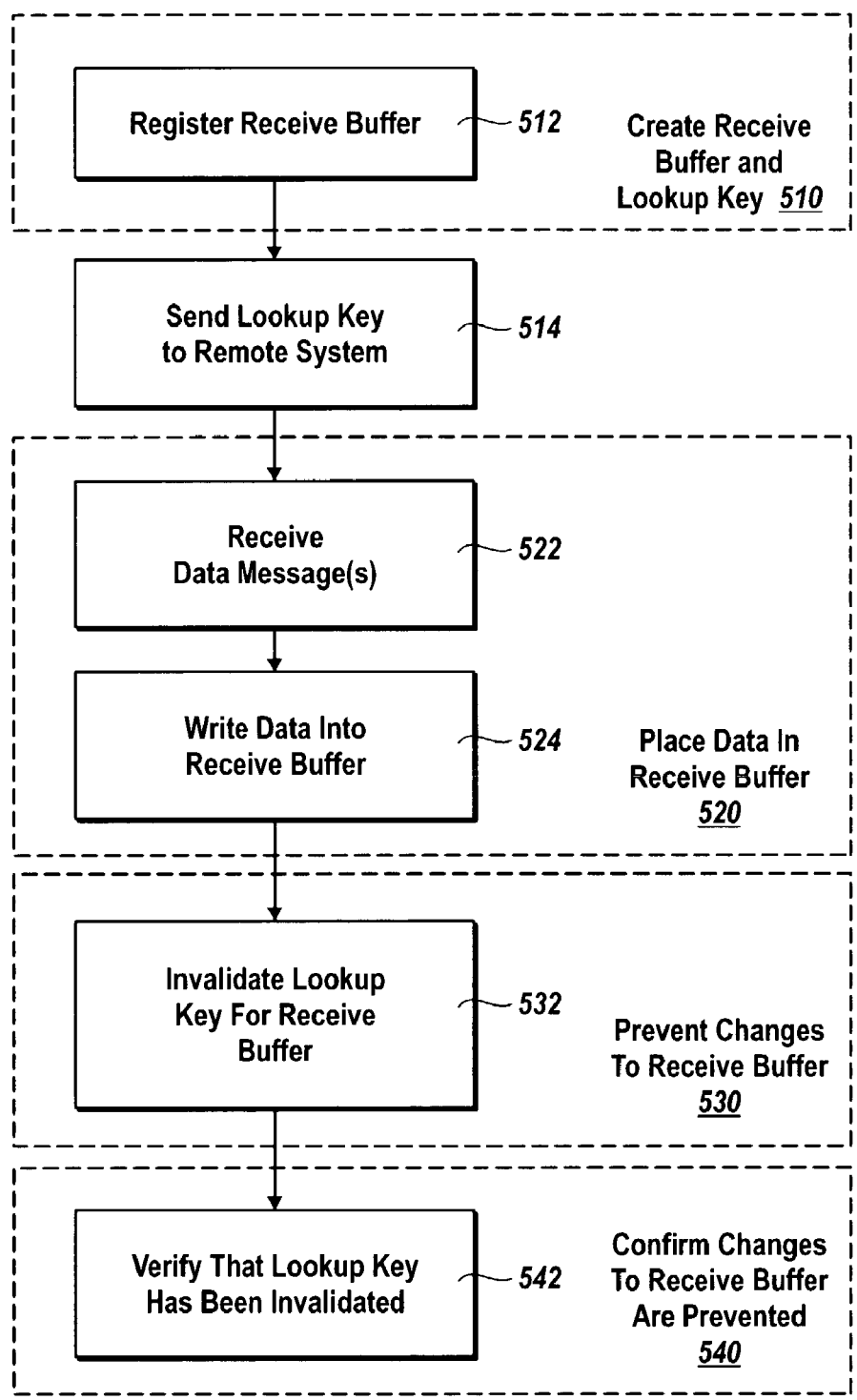
FIG. 5 shows example acts and steps for methods of reducing communication overhead between an upper layer protocol and a remote direct memory access protocol to make remote direct memory access more efficient for relatively smaller data transfers.

FIG. 5 shows example acts and steps for methods of reducing communication overhead between an upper layer protocol and a remote direct memory access protocol to make remote direct memory access more efficient for relatively smaller data transfers. A step for creating (510) a receive buffer and a corresponding lookup key for remotely accessing the receive buffer may include an act of an upper layer protocol registering (512) the receive buffer for remote direct memory access. A step for providing a remote system access to the receive buffer may include an act of sending (514) the lookup key or otherwise advertising to a remote system that the receive buffer is available for access. A step for placing (520) data from a received data message directly into the receive buffer may include an act of receiving (522) one or more data messages from a remote system, wherein the one or more data messages comprise data to write to the receive buffer and an instruction to invalidate the lookup key, and may include an act of writing (524) the data from the data message directly into the receive buffer.

A step for preventing (530) further changes to the receive buffer prior to passing the receive buffer to an upper layer protocol may include an act of the remote direct memory access protocol invalidating (532) the lookup key for the receive buffer so that no further changes can be made to the receive buffer. A step for confirming (540) that further changes to the receive buffer have been prevented may include an act of verifying that the lookup key for a receive buffer has been invalidated.

As described above, writing the data from the data message(s) into the receive buffer may occur through a buffer copy operation using one or more intermediate buffers and imposing relatively lower overhead but also offering relatively lower throughput, or may occur through a zero-copy remote direct memory access operation which bypasses the one or more intermediate buffers and imposes relatively higher overhead but also offers relatively higher throughput. Because of the relatively higher overhead of a zero-copy transfer, a buffer-copy threshold size is defined, and data transfers below the buffer-copy transfer threshold size can be performed faster using the buffer-copy transfer, even though throughput is relatively lower, due to the relatively higher overhead of the zero-copy transfer. Invalidating the lookup key by the remote direct memory access protocol reduces the relatively higher overhead of the zero-copy transfer, and the corresponding buffer-copy threshold size, so that the RDMA zero-copy transfer is faster for relatively smaller data transfers.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
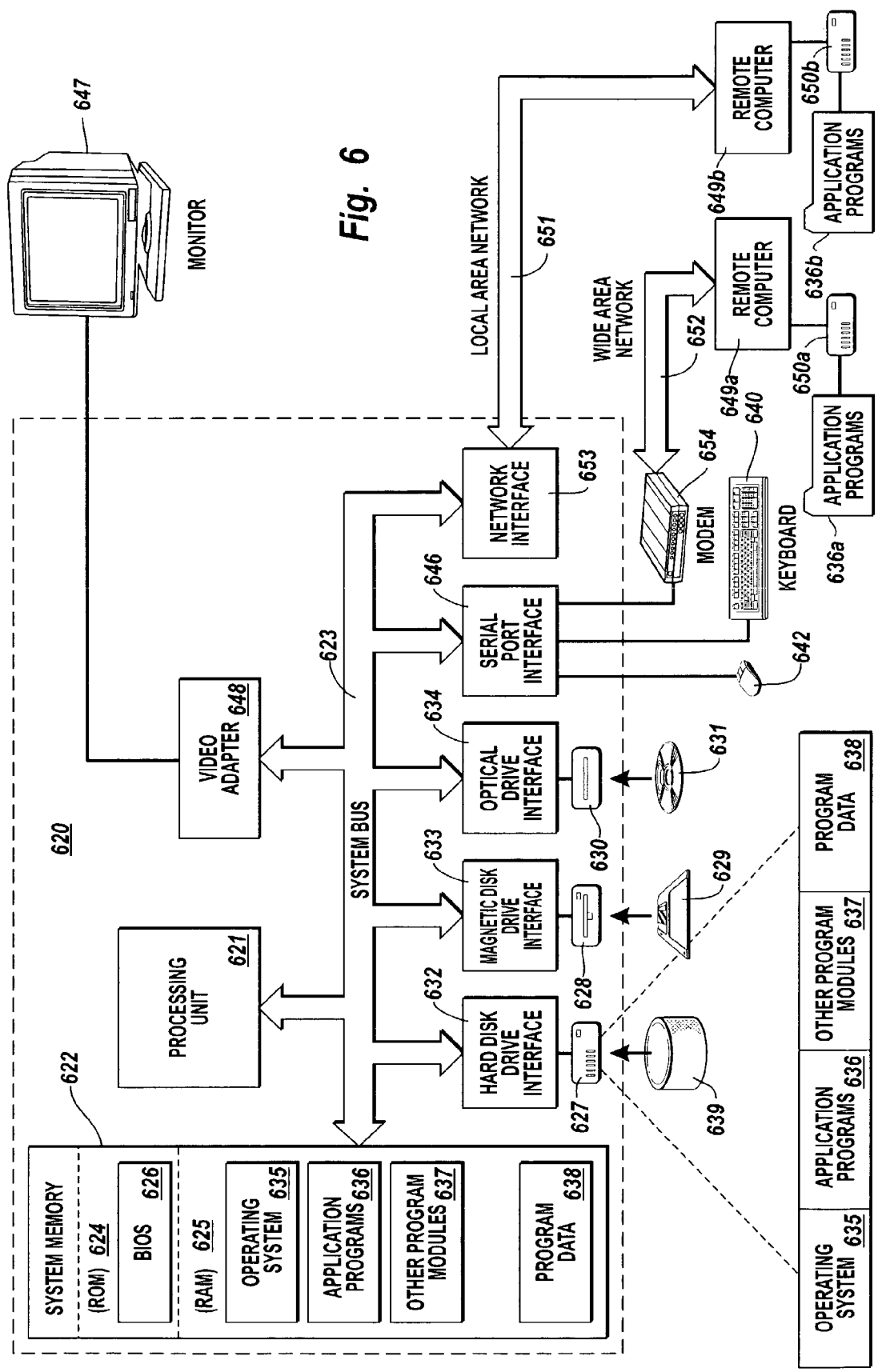
FIG. 6 illustrates an example system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a local system connected to a remote system through a network, wherein the local system comprises an upper layer protocol with a receive buffer and a remote direct memory access protocol for placing data directly into the receive buffer, a method of reducing communication overhead between the upper layer protocol and the remote direct memory access protocol to make remote direct memory access more efficient, the method comprising acts of:

the upper layer protocol registering a receive buffer for remote direct memory access, the receive buffer having a corresponding lookup key to use in accessing the receive buffer;

the remote direct memory access protocol receiving a data message from a remote system, the data message comprising data to write to the receive buffer and an instruction to invalidate the lookup key;

the remote direct memory access protocol writing the data from the data message directly into the receive buffer by utilizing at least one of:

(a) a buffer copy operation using one or more intermediate buffer and imposing relatively lower overhead but also offering relatively lower throughput, or (b) a zero-copy remote direct memory access operation which bypasses the one or more intermediate buffers and imposes relatively higher overhead but also offers relatively higher throughput, wherein the relatively higher overhead of a zero-copy transfer defines a buffer-copy threshold size, and data transfers below the buffer-copy transfer threshold size can be performed faster using the buffer-copy transfer, even though throughput is relatively lower, due to the relatively higher overhead of the zero-copy transfer;

the remote direct memory access protocol invalidating the lookup key for the receive buffer so that no further changes can be made to the receive buffer, wherein invalidating the lookup key by the remote direct memory access protocol reduces the relatively higher overhead of the zero-copy transfer, and the buffer-copy threshold size, so that the zero-copy transfer is faster for relatively smaller data transfers; and the upper layer protocol verifying that the lookup key for the receive buffer has been invalidated.

2. A method as recited in claim 1, wherein the data message comprises a message header portion and wherein the instruction to invalidate the lookup key is an argument in the message header portion.

3. A method as recited in claim 1, wherein the local system further comprises a lower layer transport protocol for delivering data received from the remote system to the remote direct memory access protocol.

4. A method as recited in claim 1, wherein writing the data into the receive buffer is part of an overall read operation initiated by the local system.

5. A method as recited in claim 1, wherein writing the data into the receive buffer is part of a disk operation, a file transfer operation, or a database operation.

6. A method as recited in claim 1, wherein the upper layer protocol determines that the remote direct memory access protocol failed to invalidate the lookup key, the method further comprising an act of the upperlayer protocol invalidating the lookup key.

7. A method as recited in claim 1, wherein the remote direct memory access protocol determines if the instruction to invalidate the lookup key originated within an authorized protection domain.

8. A method as recited in claim 1, further comprising an act of sending the lookup key to a remote system to provide the remote system with access to the receive buffer.

9. In a local system connected to a remote system through a network, wherein the local system comprises an upper layer protocol with a receive buffer and a remote direct memory access protocol for placing data directly into the receive buffer, a computer program product comprising one or more computer readable storage media having stored computer executable instructions that implement a method of reducing communication overhead between the upper layer protocol and the remote direct memory access protocol to make remote direct memory access more efficient, the method comprising acts of:

the upper layer protocol registering a receive buffer for remote direct memory access, the receive buffer having a corresponding lookup key to use in accessing the receive buffer;

the remote direct memory access protocol receiving a data message from a remote system, the data message comprising data to write to the receive buffer and an instruction to invalidate the lookup key;

the remote direct memory access protocol writing the data from the data message directly into the receive buffer by utilizing at least one of:

(a) a buffer copy operation using one or more intermediate buffer and imposing relatively lower overhead but also offering relatively lower throughput, or (b) a zero-copy remote direct memory access operation which bypasses the one or more intermediate buffers and imposes relatively higher overhead but also offers relatively higher throughput, wherein the relatively higher overhead of a zero-copy transfer defines a buffer-copy threshold size, and data transfers below the buffer-copy transfer threshold size can be performed faster using the buffer-copy transfer, even though throughput is relatively lower, due to the relatively higher overhead of the zero-copy transfer;

the remote direct memory access protocol invalidating the lookup key for the receive buffer so that no further changes can be made to the receive buffer, wherein invalidating the lookup key by the remote direct memory access protocol reduces the relatively higher overhead of the zero-copy transfer, and the buffer-copy threshold size, so that the zero-copy transfer is faster for relatively smaller data transfers; and the upper layer protocol verifying that the lookup key for the receive buffer has been invalidated.

10. A computer program product as recited in claim 9, wherein the data message comprises a message header portion and wherein the instruction to invalidate the lookup key is an argument in the message header portion.

11. A computer program product as recited in claim 9, wherein the local system further comprises a lower layer transport protocol for delivering data received from the remote system to the remote direct memory access protocol.

12. A computer program product as recited in claim 9, wherein writing the data into the receive buffer is part of an overall read operation initiated by the local system.

13. A computer program product as recited in claim 9, wherein writing the data into the receive buffer is part of a disk operation, a file transfer operation, or a database operation.

14. A computer program product as recited in claim 9, wherein the upper layer protocol determines that the remote direct memory access protocol failed to invalidate the lookup key, the method further comprising an act of the upper layer protocol invalidating the lookup key.

15. A computer program product as recited in claim 9, wherein the remote direct memory access protocol determines if the instruction to invalidate the lookup key originated within an authorized protection domain.

16. A computer program product as recited in claim 9, the method further comprising an act of advertising to a remote system that the receive buffer is available for access.

17. In a local system connected to a remote system through a network, wherein the local system comprises an upper layer protocol with a receive buffer and a remote direct memory access protocol for placing data directly into the receive buffer, a method of reducing communication overhead between the upper layer protocol and the remote direct memory access protocol to make remote direct memory access more efficient, the method comprising steps for:

the upper layer protocol creating a receive buffer and a corresponding lookup key for remotely accessing the receive buffer;

for a received data message comprising data to write to the receive buffer and a command to prevent further use of the lookup key, the remote direct memory access protocol placing the data from the data message directly into the receive buffer by utilizing at least one of:
  (a) a buffer copy operation using one or more intermediate buffer and imposing relatively lower overhead but also offering relatively lower throughput, or
  (b) a zero-copy remote direct memory access operation which bypasses the one or more intermediate buffers and imposes relatively higher overhead but also offers relatively higher throughput, wherein the relatively higher overhead of a zero-copy transfer defines a buffer-copy threshold size, and data transfers below the buffer-copy transfer threshold size can be performed faster using the buffer-copy transfer, even though throughput is relatively lower, due to the relatively higher overhead of the zero-copy transfer;

the remote direct memory access protocol preventing further changes to the receive buffer prior to passing the receive buffer to the upper layer protocol by invalidating the lookup key to prevent further use of the lookup key and wherein invalidating the lookup key by the remote direct memory access protocol reduces the relatively higher overhead of the zero-copy transfer, and the buffer-copy threshold size, so that the zero-copy transfer is faster for relatively smaller data transfers; and the upper layer protocol confirming that further changes to the receive buffer have been prevented.

18. A method as recited in claim 17, wherein the data message comprises a message header portion, and wherein the data message comprises a message header portion that includes the command to prevent further use of the lookup key.

19. A method as recited in claim 18, wherein the remote direct memory access protocol determines if the command to prevent further use of the lookup key originated within an authorized protection domain.

20. A method as recited in claim 18, wherein the local system further comprises a lower layer transport protocol for delivering data received from the remote system to the remote direct memory access protocol.

21. A method as recited in claim 17, wherein writing the data into the receive buffer is part of an overall read operation initiated by the local system.

22. A method as recited in claim 17, wherein writing the data into the receive buffer is part of a disk operation, a file transfer operation, or a database operation.

23. A method as recited in claim 17, wherein the upper layer protocol determines that the remote direct memory access protocol failed to prevent further changes to the receive buffer, the method further comprising a step for the upper layer protocol preventing further changes to the receive buffer.

24. In a local system connected to a remote system through a network, wherein the local system comprises an upper layer protocol with a receive buffer and a remote direct memory access protocol for placing data directly into the receive buffer, a computer program product comprising one or more computer readable storage media having stored computer executable instruction that implement a method of reducing communication overhead between the upper layer protocol and the remote direct memory access protocol to make remote direct memory access more efficient, the method comprising steps for:

the upper layer protocol creating a receive buffer and a corresponding lookup key for remotely accessing the receive buffer;

for a received data message comprising data to write to the receive buffer and a command to prevent further use of the lookup key, the remote direct memory access protocol placing the data from the data message directly into the receive buffer by utilizing at least one of:
  (a) a buffer copy operation using one or more intermediate buffer and imposing relatively lower overhead but also offering relatively lower throughput, or
  (b) a zero-copy remote direct memory access operation which bypasses the one or more intermediate buffers and imposes relatively higher overhead but also offers relatively higher throughput, wherein the relatively higher overhead of a zero-copy transfer defines a buffer-copy threshold size, and data transfers below the buffer-copy transfer threshold size can be performed faster using the buffer-copy transfer, even though throughput is relatively lower, due to the relatively higher overhead of the zero-copy transfer;

the remote direct memory access protocol preventing further changes to the receive buffer prior to passing the receive buffer to the upper layer protocol by invalidating the lookup key to prevent further use of the lookup key and wherein invalidating the lookup key by the remote direct memory access protocol reduces the relatively higher overhead of the zero-copy transfer, and the buffer-copy threshold size, so that the zero-copy transfer is faster for relatively smaller data transfers; and the upper layer protocol confirming that further changes to the receive buffer have been prevented.

25. A computer program product as recited in claim 24, wherein the data message comprises a message header portion, and wherein the data message comprises a message header portion that includes the command to prevent further use of the lookup key.

26. A computer program product as recited in claim 25, wherein the remote direct memory access protocol determines if the command to prevent further use of the lookup key originated within an authorized protection domain.

27. A computer program product as recited in claim 24, wherein the local system further comprises a lower layer transport protocol for delivering data received from the remote system to the remote direct memory access protocol.

28. A computer program product as recited in claim 24, wherein writing the data into the receive buffer is part of an overall read operation initiated by the local system.

29. A computer program product as recited in claim 24, wherein writing the data into the receive buffer is part of a disk operation, a file transfer operation, or a database operation.

30. A computer program product as recited in claim 24, wherein the upper layer protocol determines that the remote direct memory access protocol failed to prevent further changes to the receive buffer, the method further comprising a step for the upper layer protocol preventing further changes to the receive buffer.

31. A computer program product as recited in claim 24, the method further comprising a step for providing a remote system access to the receive buffer.

* * * * *